(12) United States Patent
Alberth, Jr.

(10) Patent No.: US 10,627,123 B2
(45) Date of Patent: Apr. 21, 2020

(54) THERMOSTAT WITH MASTER CONTROL FEATURES

(71) Applicant: Johnson Controls Technology Company, Plymouth, MI (US)

(72) Inventor: William P. Alberth, Jr., Prairie Grove, IL (US)

(73) Assignee: Johnson Controls Technology Company, Auburn Hills, MI (US)

(*) Notice: Subject to any disclaimer, the term of this patent is extended or adjusted under 35 U.S.C. 154(b) by 261 days.

(21) Appl. No.: 15/375,062

(22) Filed: Dec. 9, 2016

(65) Prior Publication Data

US 2018/0163984 A1 Jun. 14, 2018

(51) Int. Cl.
*F24F 11/30* (2018.01)
*F24F 11/70* (2018.01)
*F24F 11/62* (2018.01)
*G05D 23/19* (2006.01)
*F24F 11/56* (2018.01)
(Continued)

(52) U.S. Cl.
CPC ............ *F24F 11/30* (2018.01); *F24F 11/62* (2018.01); *F24F 11/70* (2018.01); *G05D 23/1904* (2013.01); *G05D 23/1905* (2013.01); *G05D 23/1931* (2013.01); *F24F 11/46* (2018.01); *F24F 11/56* (2018.01); *F24F 2110/10* (2018.01); *F24F 2120/20* (2018.01)

(58) Field of Classification Search
CPC .. F24F 11/30; G05D 23/19–5; G05D 23/1931
See application file for complete search history.

(56) References Cited

U.S. PATENT DOCUMENTS 8,374,725 B1* 2/2013 Ols ............... F24F 13/1426
700/277
2005/0267606 A1* 12/2005 Bartlett, Jr. ......... G05B 13/042
700/29
(Continued)

OTHER PUBLICATIONS

Search Report for International Application No. PCT/US2017/065090, dated Feb. 20, 2018, 14 pages.
(Continued)

*Primary Examiner* — Ljiljana V. Ciric
*Assistant Examiner* — Alexis K Cox
(74) *Attorney, Agent, or Firm* — Foley & Lardner LLP

(57) ABSTRACT

A thermostat for a building space includes a communication interface and a processing circuit. The communications interface is configured to communicate with one or more user devices and a master device. The processing circuit is configured to determine a master temperature setpoint based on input received from the master device via the communications interface and determine a non-master temperature setpoint based on input received from the one or more user devices via the communications interface. The processing circuit is configured to select one of the master temperature setpoint and the non-master temperature setpoint based on an operating mode of the thermostat. Based on the selected temperature setpoint, the processing circuit is configured to generate and provide control signals for building equipment. The control signals cause the building equipment to control an ambient temperature of the building space to the selected setpoint.

9 Claims, 9 Drawing Sheets

(51) Int. Cl.
*F24F 120/20* (2018.01)
*F24F 110/10* (2018.01)
*F24F 11/46* (2018.01)

(56) References Cited

U.S. PATENT DOCUMENTS

| | | |
|---|---|---|
| 2006/0071089 A1 | 4/2006 | Kates |
| 2008/0120446 A1* | 5/2008 | Butler ............... F24F 11/30 710/63 |
| 2008/0277486 A1* | 11/2008 | Seem ............... H04L 67/125 236/49.3 |
| 2009/0065596 A1* | 3/2009 | Seem ............... F24F 11/30 236/51 |
| 2010/0107070 A1* | 4/2010 | Devineni ........... B60H 1/00985 715/702 |
| 2012/0233478 A1* | 9/2012 | Mucignat ............. H04W 4/80 713/320 |
| 2013/0226320 A1 | 8/2013 | Berg-Sonne et al. |
| 2014/0039690 A1 | 2/2014 | Steinberg |
| 2014/0222241 A1* | 8/2014 | Ols ................ G05B 15/02 700/299 |
| 2014/0358293 A1 | 12/2014 | Fadell et al. |
| 2015/0066220 A1 | 3/2015 | Sloo et al. |
| 2016/0327299 A1 | 11/2016 | Ribbich et al. |
| 2016/0327300 A1 | 11/2016 | Ribbich et al. |
| 2016/0327301 A1 | 11/2016 | Ribbich et al. |
| 2016/0327302 A1 | 11/2016 | Ribbich et al. |
| 2016/0327921 A1 | 11/2016 | Ribbich et al. |

OTHER PUBLICATIONS

U.S. Appl. No. 14/253,097, filed Apr. 15, 2014, GreenEdge Technologies.
U.S. Appl. No. 15/260,293, filed Sep. 11, 2016, Johnson Controls Technology Company.
U.S. Appl. No. 15/260,294, filed Sep. 11, 2016, Johnson Controls Technology Company.
U.S. Appl. No. 15/260,295, filed Sep. 11, 2016, Johnson Controls Technology Company.
U.S. Appl. No. 15/260,297, filed Sep. 11, 2016, Johnson Controls Technology Company.
U.S. Appl. No. 15/260,298, filed Sep. 11, 2016, Johnson Controls Technology Company.
U.S. Appl. No. 15/260,299, filed Sep. 11, 2016, Johnson Controls Technology Company.
U.S. Appl. No. 15/260,301, filed Sep. 11, 2016, Johnson Controls Technology Company.
U.S. Appl. No. 15/336,789, filed May 4, 2016, Johnson Controls Technology Company.
U.S. Appl. No. 15/336,791, filed May 4, 2016, Johnson Controls Technology Company.
U.S. Appl. No. 15/336,792, filed May 4, 2016, Johnson Controls Technology Company.
U.S. Appl. No. 15/336,793, filed May 4, 2016, Johnson Controls Technology Company.

* cited by examiner

THERMOSTAT WITH MASTER CONTROL FEATURES

BACKGROUND

The present disclosure relates generally to HVAC control devices. The present disclosure relates more particularly to thermostats.

A thermostat can be configured to receive a single setpoint via a user interface, a dial, a knob, and/or any other input device. The thermostat can control various residential and/or industrial equipment based on the setpoint received from the input device. Further, the thermostat monitors the ambient temperature of a zone or building that the equipment controls so that it can appropriately regulate the temperature of the zone or building to the temperature setpoint. In various embodiments, the thermostat may cause building equipment to heat and/or cool zones of a building and/or an entire building.

SUMMARY

One implementation of the present disclosure is a thermostat for a building space. The thermostat includes a communication interface and a processing circuit. The communications interface is configured to communicate with one or more user devices and a master device. The processing circuit is configured to determine a master temperature setpoint based on input received from the master device via the communications interface and determine a non-master temperature setpoint based on input received from the one or more user devices via the communications interface. The processing circuit is configured to select one of the master temperature setpoint and the non-master temperature setpoint based on an operating mode of the thermostat. Based on the selected temperature setpoint, the processing circuit is configured to generate and provide control signals for building equipment. The control signals cause the building equipment to control an ambient temperature of the building space to the selected setpoint. The processing circuit is further configured to communicate an identity of the master device to at least one of the one or more user devices.

In some embodiments, the processing circuit is configured to determine the non-master temperature setpoint by generating an average temperature setpoint based on the input received from the user devices and in response to a determination that the operating mode of the thermostat is average mode. In some embodiments, the processing circuit can generate a voted setpoint based on a setpoint with a highest number of votes. The input received from the user devices may include votes for one or more setpoints.

In some embodiments, the processing circuit is configured to generate the average temperature setpoint. The average temperature setpoint can be generated by determining user setpoints from the input received from the one or more user devices, validating the user setpoints by determining that the user setpoints are within a predefined setpoint range and averaging the validated setpoints.

In some embodiments, the processing circuit is configured to receive, via the communications interface, one or more lengths of time that each of the users of the user devices will be in the building space from the user devices. Averaging the validated setpoints may include determining a weighted average of the user setpoints based on each of the lengths of time associated with each user setpoint.

In some embodiments, the processing circuit is configured to generate the average temperature setpoint by causing the communications interface to send a message to the user devices, the message prompting one or more users of the user devices to indicate whether the one or more users are in the building space. In some embodiments, generating the average temperature setpoint includes receiving, via the communications interface, an indication from one or more of the user devices that one or more of the users are in the building space and generating the average temperature setpoint based on the user setpoints associated with users that are in the building space.

In some embodiments, the processing circuit is configured to generate the voted setpoint by sending, via the communications interface, a message to one or more of the user devices. The message may include a prompt to vote for one or more setpoints. Generating the voted setpoint may also include receiving, via the communications interface, one or more votes for one or more setpoints from the user devices, setting the non-master setpoint to the setpoint with the highest number of votes in response to a determination that the thermostat is in voting mode, and selecting the non-master temperature setpoint from the master temperature setpoint and the non-master temperature setpoint in response to the determination that the operating mode is in the voting mode.

In some embodiments, the processing circuit is configured to receive, via the communications interface, a request to set the operating mode of the thermostat to a requested operating mode from one of the user devices, send, via the communications interface, the request to the master device and receive from the master device, via the communications interface, a confirmation that the master device has accepted the request, and set the operating mode of the thermostat to the requested operating mode in response to receiving the confirmation from the master device.

In some embodiments, the processing circuit is configured to authenticate the master device and receive the operating mode from the authenticated master device via the communications interface.

In some embodiments, the processing circuit is configured to send a message to one of the user devices in response to a determination that the one of the user devices requests a temperature setpoint change and the operating mode of the thermostat is the master mode. The message may include an indication of an identity of a user of the master device.

Another implementation of the present disclosure is a method for operating a thermostat for a building space. The method includes determining a master temperature setpoint based on input received from a master device via a communications interface and determining a non-master temperature setpoint based on input received from one or more user devices via the communications interface. The method further includes selecting one of the master temperature setpoint and the non-master temperature setpoint based on an operating mode of the thermostat and generating and providing control signals for building equipment based on the selected temperature setpoint. The control signals cause the building equipment to control an ambient temperature of the building space to the selected setpoint. The method further includes communicating an identity of the master device to at least one of the one or more user devices. A message can be sent to at least one user device with information about the master device. The information may be an identification such as an identification of the master device, and/or an identification of the user of the master device.

In some embodiments, the method further includes authenticating the master device and receiving the operating mode from the authenticated master device via the communications interface.

In some embodiments, determining the non-master temperature setpoint includes generating an average temperature setpoint based on the input received from the user devices in response to a determination that the operating mode of the thermostat is average mode and generating a voted setpoint based on a setpoint with a highest number of votes. The input received from the user devices may include votes for one or more setpoints.

In some embodiments, generating the average temperature setpoint includes validating user setpoints by determining that the setpoints are within a predefined setpoint range. The user setpoints may be determined from the input received from the user devices. Generating the average temperature setpoint may also include averaging the validated setpoints.

In some embodiments, the method further includes causing the communications interface to send a message to the user devices prompting one or more users of the user devices to indicate whether the one or more user devices are in a zone associated with the thermostat. The method may also include receiving, via the communications interface, an indication from one or more of the user devices that one or more of the user devices are in the zone associated with the thermostat and generating the average temperature setpoint based on the user setpoints associated with users that are in the building space.

In some embodiments, the method further includes receiving, via the communications interface, a request to change the operating mode of the thermostat to a requested operating mode from one of the user devices, sending, via the communications interface, the request to the master device and receiving from the master device, via the communications interface, a confirmation that the master device has accepted the request and setting the operating mode of the thermostat to the requested operating mode in response to receiving the confirmation from the master device.

In some embodiments, the method further includes sending, via the communications interface, a message to one or more of the user devices. The message may include a prompt to vote for one or more setpoints.

Another implementation of the present disclosure is a thermostat for a building space. The thermostat includes a communications interface configured to provide control signals to building equipment that operate to affect an environmental condition of the building space. The thermostat further includes a processing circuit. The processing circuit is configured to operate the thermostat in a master mode in which a master setpoint is used to generate the control signals for the building equipment. The processing circuit is configured to operate the thermostat in a non-master mode in which a non-master setpoint is used to generate the control signals for the building equipment. The thermostat is configured to determine whether a user requesting a setpoint change is a master user or a non-master user and whether the thermostat is operating in the master mode or the non-master mode. In response to a determination that the user requesting the setpoint change is a non-master user and the thermostat is operating in the master mode, the processing circuit is configured to present a message to the non-master user, the message identifying the master user and indicating that the master setpoint cannot be changed by the non-master user.

In some implementations, the thermostat further includes a user interface configured to present information and receive user input. The processing circuit may be configured to receive the requested setpoint change from the non-master user and present the message to the non-master user via the user interface.

In some embodiments, the processing circuit is configured to receive the master setpoint via the user interface.

In some embodiments, the processing circuit is configured to authenticate the master user and receive an operating mode from the master user via the user interface. The operating mode may be one of the master mode, an average mode, and a voting mode.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Figure 1:
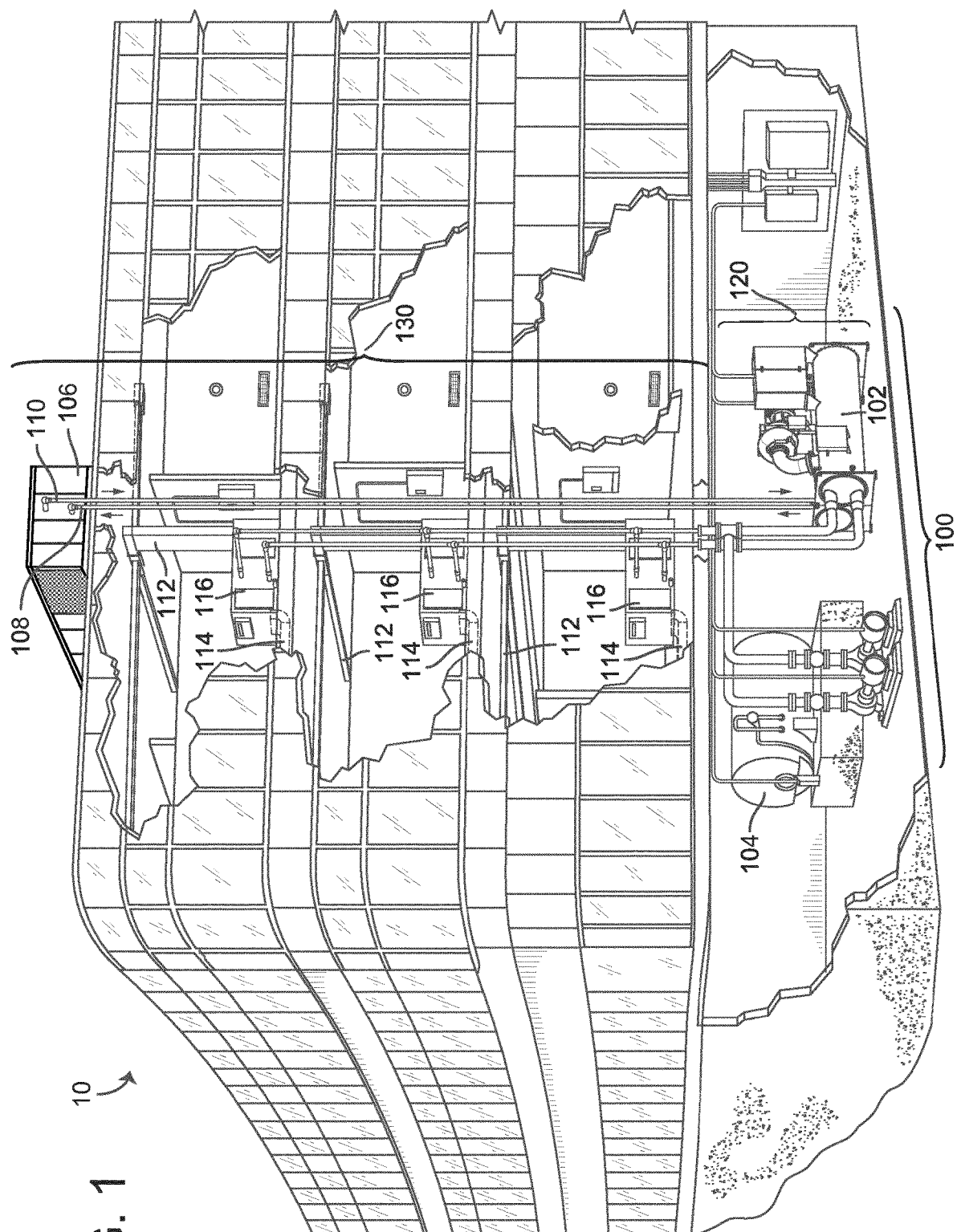
FIG. 1 is a schematic drawing of a building equipped with a HVAC system, according to an exemplary embodiment.

Referring generally to the FIGURES, systems and methods for controlling the setpoint of a thermostat are shown, according to various exemplary embodiments. The thermostat may be configured to receive a setpoint from a mobile device. Based on the setpoint received from the mobile device, the thermostat can cause various zones and/or a building to be heated and/or cooled to the received setpoint. In various embodiments, the thermostat receives multiple setpoints from multiple mobile devices. When multiple setpoints have been received by the thermostat, the thermostat may determine an appropriate action to determine what setpoint to use. In some embodiments, the actions are averaging the setpoints or selecting one of the setpoints.

The thermostat may operate in one or more modes. The modes may include a master mode, an average mode, and a voting mode. When the thermostat operates in the master mode, only a master device may be able to change the setpoint of the thermostat. The master device may have special permissions to operate the thermostat. In master mode, when a user attempts to change the setpoint via their user device, the thermostat may ignore the setpoint request and may send a message to the user device indicating that the user does not have permission to change the setpoint and must ask the master to change the setpoint. The message may include the identity of the master, a picture of the master, contact information of the master, and/or any other information.

In the average mode, the thermostat may be configured to receive one or more setpoints from the user devices and generate an average setpoint. In various embodiments, the average is a weighted average. The average may be weighted based on the length of time that each requesting user will be in the zone controlled by the thermostat. Each user device may send an approximate length of time that they will be in the zone along with the requested setpoint to the thermostat.

When the thermostat is operating in voting mode, one or more users may be able to vote, via their user devices, for one or more setpoints. The thermostat may be configured to send a vote message (i.e., a setpoint poll) to each user device associated and/or logged in with the thermostat. Each user, via their user device, may reply with their vote and/or may enter a new setpoint into the setpoint vote. The thermostat can count up all of the setpoint votes and implement the setpoint which receives the highest number of user votes.

Several examples of thermostats that can receive a temperature setpoint are described in detail in U.S. Provisional Patent Application No. 62/247,672 filed Oct. 28, 2015, U.S. Provisional Patent Application No. 62/275,199 filed Jan. 5, 2016, U.S. Provisional Patent Application No. 62/274,750 filed Jan. 4, 2016, U.S. Provisional Patent Application No. 62/275,202 filed Jan. 5, 2016, U.S. Provisional Patent Application No. 62/275,204 filed Jan. 5, 2016, U.S. Provisional Patent Application No. 62/275,711 filed Jan. 6, 2016, U.S. patent application Ser. No. 15/336,793 filed Oct. 28, 2016, U.S. patent application Ser. No. 15/336,792 filed Oct. 28, 2016, U.S. patent application Ser. No. 15/336,789 filed Oct. 28, 2016, and U.S. patent application Ser. No. 15/336,791 filed Oct. 28, 2016. The entire disclosure of each of these patent applications is incorporated by reference herein.

Building Management System and HVAC System

Figure 2:
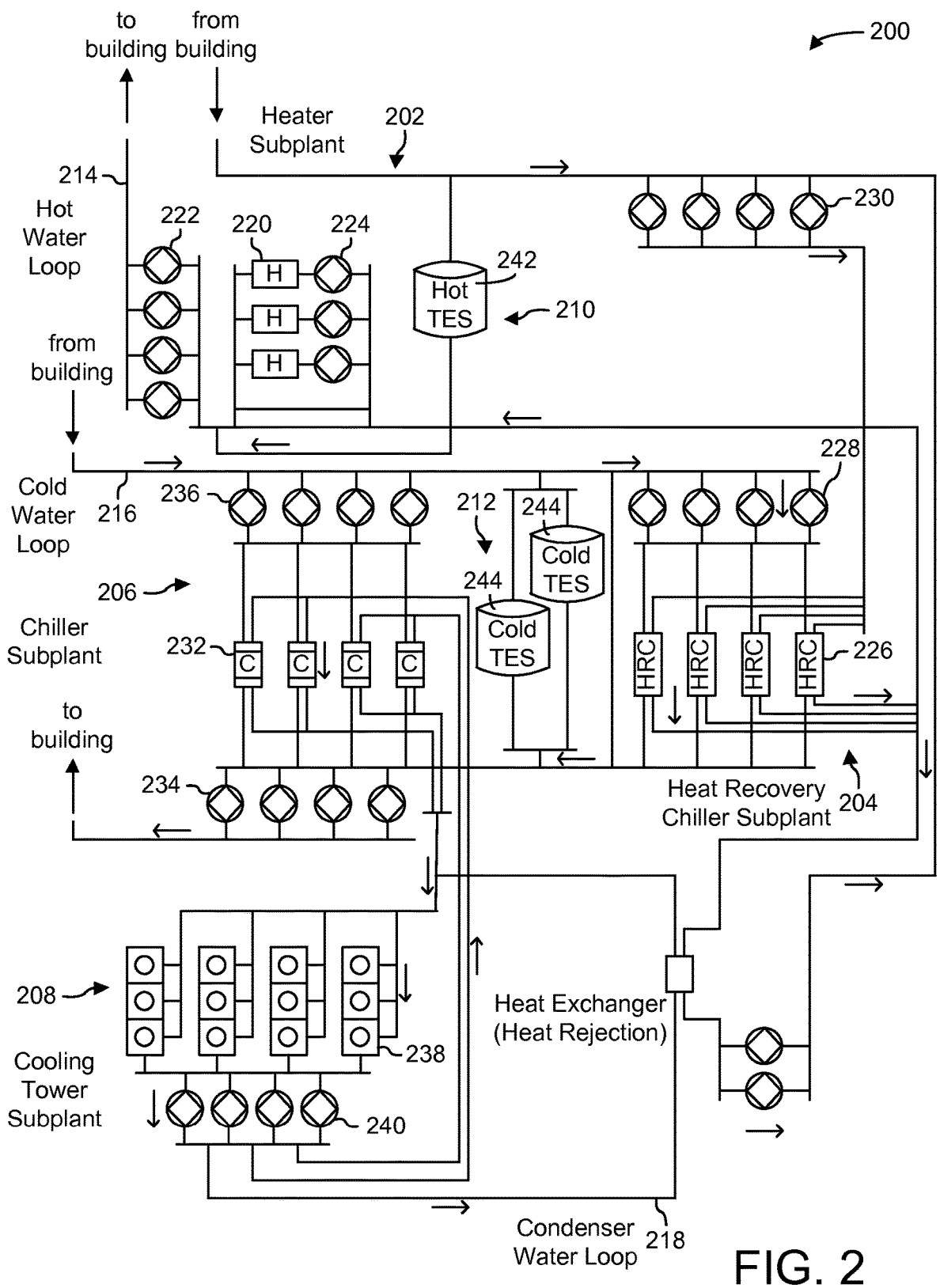
FIG. 2 is a block diagram of a waterside system that may be used in conjunction with the building of FIG. 1, according to an exemplary embodiment.
Figure 3:
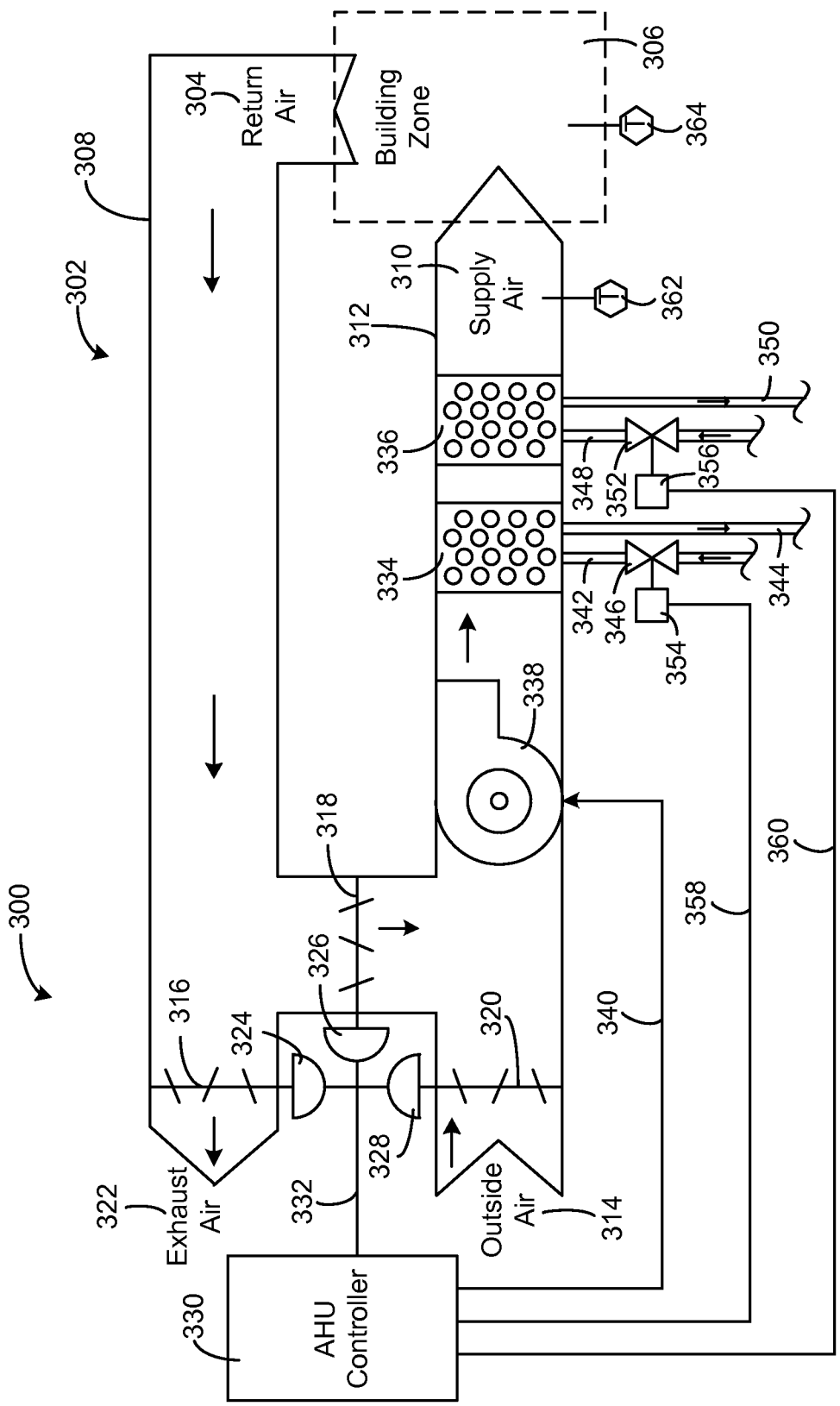
FIG. 3 is a block diagram of an airside system that may be used in conjunction with the building of FIG. 1, according to an exemplary embodiment.

Referring now to FIGS. 1-3, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Thermostat Systems and Methods

Figure 4:
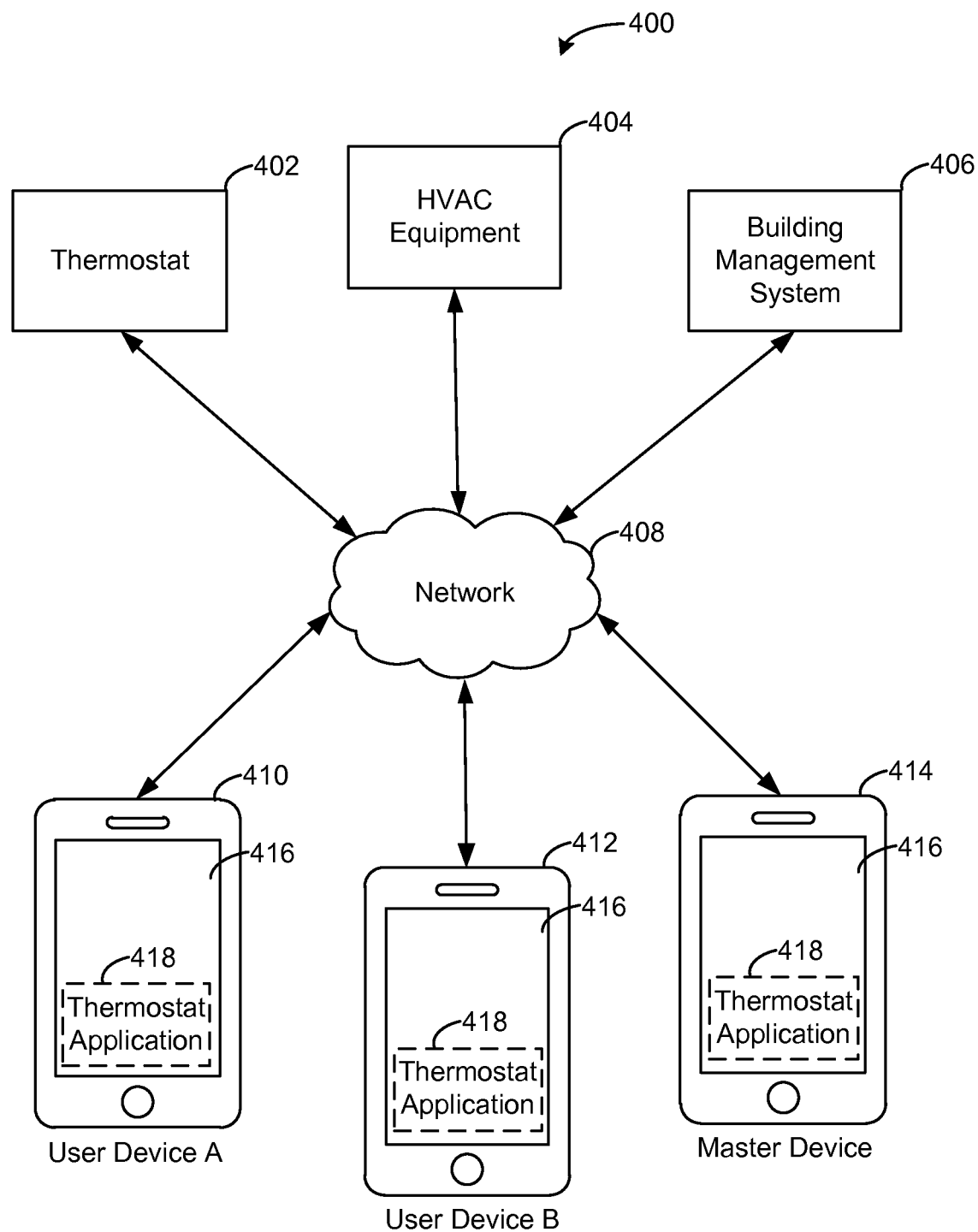
FIG. 4 is a block diagram of a communications system located in the building of FIG. 1, according to an exemplary embodiment.

Referring now to FIG. 4, a block diagram of communications system 400 is shown, according to an exemplary embodiment. System 400 can be implemented in a building (e.g. building 10) and is shown to include a thermostat 402, HVAC equipment 404, a building management system 406, a network 408, a user device A 410, a user device B 412, and a master device 414. In various embodiments, the devices and systems of system 400 are communicably coupled via network 408. User device A 410, user device B 412, and master device 414 are each shown to include a display 416 and operate a mobile device application, thermostat application 418.

Thermostat 402 may be any type of thermostat and/or HVAC controller. In various embodiments, thermostat 402 is configured to cause HVAC equipment 404 to heat and/or cool a building (e.g., building 10) to a temperature setpoint. In some embodiments, thermostat 402 receives one or more setpoints from user device A 410, user device B 412, and/or master device 414. Thermostat 402 may be configured to cause HVAC equipment 404 to operate HVAC equipment 404 based on a setpoint vote, a setpoint average, and/or a master setpoint based on the setpoints received from user device A 410, user device B 412, and/or master device 414.

HVAC equipment 404 may be various devices and/or systems configured to heat and/or cool a building. In some embodiments, the systems are residential HVAC systems and may include an indoor unit and/or an outdoor unit. In various embodiments, the indoor unit is one or a combination of an air conditioner (AC) unit and/or a heat pump (HP) unit. In various embodiments, HVAC equipment 404 includes an air handler unit (AHU) a rooftop unit (RTU) and any other device and/or system as described in FIGS. 1-3. HVAC equipment 404 may be any conventional and/or nonconventional HVAC device and/or system. HVAC equipment 404 may include remote sensors. In some embodiments, the remote sensors are temperature and/or humidity sensors measuring temperature values and/or humidity values of various zones of a building (e.g., building 10). In various embodiments, the remote sensors may report various ambient temperature values and/or ambient humidity values to at least one of building management system 406 and/or thermostat 402. In various embodiments, thermostat 402 is configured to measure an ambient temperature of the zone which thermostat 402 is located. As used herein, "zone" or "building space" may refer to predefined section, room, floor, group of rooms, group of floors, and/or area of a building.

User device A 410, user device B 412, and master device 414 are shown to include a display 416. Display 416 may be configured to display images and/or content to a user and receive input from a user. In some embodiments, display 416 is at least one of a capacitive touch screen, a projective capacitive touch screen, a resistive touch screen, a LCD screen, an OLED screen, and/or any other screen and/or touch screen. In various embodiments, display 416 includes various buttons and/or switches.

In various embodiments, a user (i.e., an individual, a building occupant, etc.) is able to request thermostat 402 implement a setpoint by entering the setpoint into thermostat application 418. The setpoint requested by a user that is not a master may be referred to as a "requested setpoint", a "user setpoint", "non-master setpoint" and/or any other name herein that indicates that the setpoint is not a master setpoint. Thermostat application 418 may be at least one of a mobile application and/or a web browser based application. Thermostat application 418 can be used to send a setpoint request to thermostat 402. Thermostat application 418 may be configured to send thermostat 402 the length of time which the user will be in the zone which the user requests a setpoint change. In some embodiments, thermostat application 418 receives the length of time from the user via display 416. In various embodiments, thermostat application 418 communicates with a calendar application on at least the device which thermostat application 418 is operating. The calendar application may be at least one or a combination of Google Calendar, Apple Calendar, Outlook, Fantastical, SolCalendar, and/or any other calendar application.

Master device 414 may be associated with a master user. In various embodiments, master device 414 can override the setpoint of thermostat 402 and/or change the operating mode of thermostat 402. In various embodiments, the master device 414 can authenticate with thermostat 402 and/or building management system 406. When the master device 414 is authenticated and/or logged in with thermostat 402 and/or building management system 406, the master user may be able to change the setpoint and/or operating mode of thermostat 405 via thermostat application 418. In various embodiments, thermostat 402 and/or building management system 406 stores a picture of the master user and/or the name and/or contact information of the master user. In various embodiments, master device 414 sends the master information to thermostat 402 and/or building management system 406 via network 408. As used herein, "master," "current master," and/or "master user" may refer to a user who is associated with master device 114. Further, "master" may refer to a user associated with a profile and/or account on the Internet, thermostat 402, and/or building management system 406 that can be logged into via master device 114 and/or any other device.

In various embodiments, thermostat application 418 is configured to display the identity of the current master of thermostat 402. The master may have absolute control of thermostat 402 and may be able to stop at least one of user device A 410, user device B 412, and/or master device 414 from adjusting the setpoint value of thermostat 402. In some embodiments, a user may cause thermostat application 418 to send a message to the master asking that the master change the setpoint to a certain value. Further, a user can cause thermostat application 418 to send a message to the master asking that the master change the current operating mode (i.e., master mode, average mode, voting mode, etc.) of thermostat 402.

In some embodiments, building management system 406 is configured to cause zones of a building (e.g., building 10) to be controlled to the setpoint received from thermostat 402. For example, building management system 406 may be configured to control the temperature, humidity, lighting, and/or other environmental conditions of a building based on the setpoints or control signals received from thermostat 402. In some embodiments, building management system 406 is configured to send various zone temperatures and humidity values to thermostat 402. Based on the various temperature and humidity values, thermostat 402 may be configured to generate control signals for HVAC equipment 404 based on the various temperature and humidity values of various zones of a building (e.g., building 10) received from building management system 406.

Network 408 may be a wired and/or wireless network such as at least one of and/or a combination of a Wi-Fi network, a wired Ethernet network, a Zigbee network, and a Bluetooth network. In some embodiments, network 408 is an HVAC network. In various embodiments, the HVAC network operates with a proprietary communication protocol. Network 408 may be a local area network or a wide area network (e.g., the Internet, a building WAN, etc.) and may use a variety of communications protocols (e.g., N2, BACnet, BACnet MS/TP, IP, LON, etc.) In various embodiments, the communications protocols may be physically implemented over RS-485, RS-232, RS-422, PS/2, USB, fire wire, Ethernet, Zigbee, Wi-Fi, etc. In some embodiments, network 408 is an ad hoc network (ad hoc Wi-Fi, ad hoc Zigbee, ad hoc Bluetooth, NFC, etc.) In some embodiments, the devices and/or systems of system 400 form a MANET, a VANET, a SPAN, an IMANET, and/or any other ad hoc network. Network 408 may include routers, cables, network switches, connectors, wireless repeaters, radio modules, and/or any other component necessary for implementing wireless and/or wired communication.

Building management system 406 may be configured to login various users and/or devices (e.g., user device A 410, user device B 412, master device 414, etc.). Building management system 406 may login various users with thermostats (e.g., thermostat 402) and or zones of a building (e.g., building 10). In some embodiments, building management system 406 is configured to login one or more users with a user name and password via thermostat application 418. Building management system 406 may receive various setpoint requests, mode requests, and/or any other operating requests for a zone and/or thermostat. Building management system 406 may be configured to implement the various setpoint requests and send notifications to the user devices (user device A 410, user device B 412, and/or master device 414).

Figure 5:
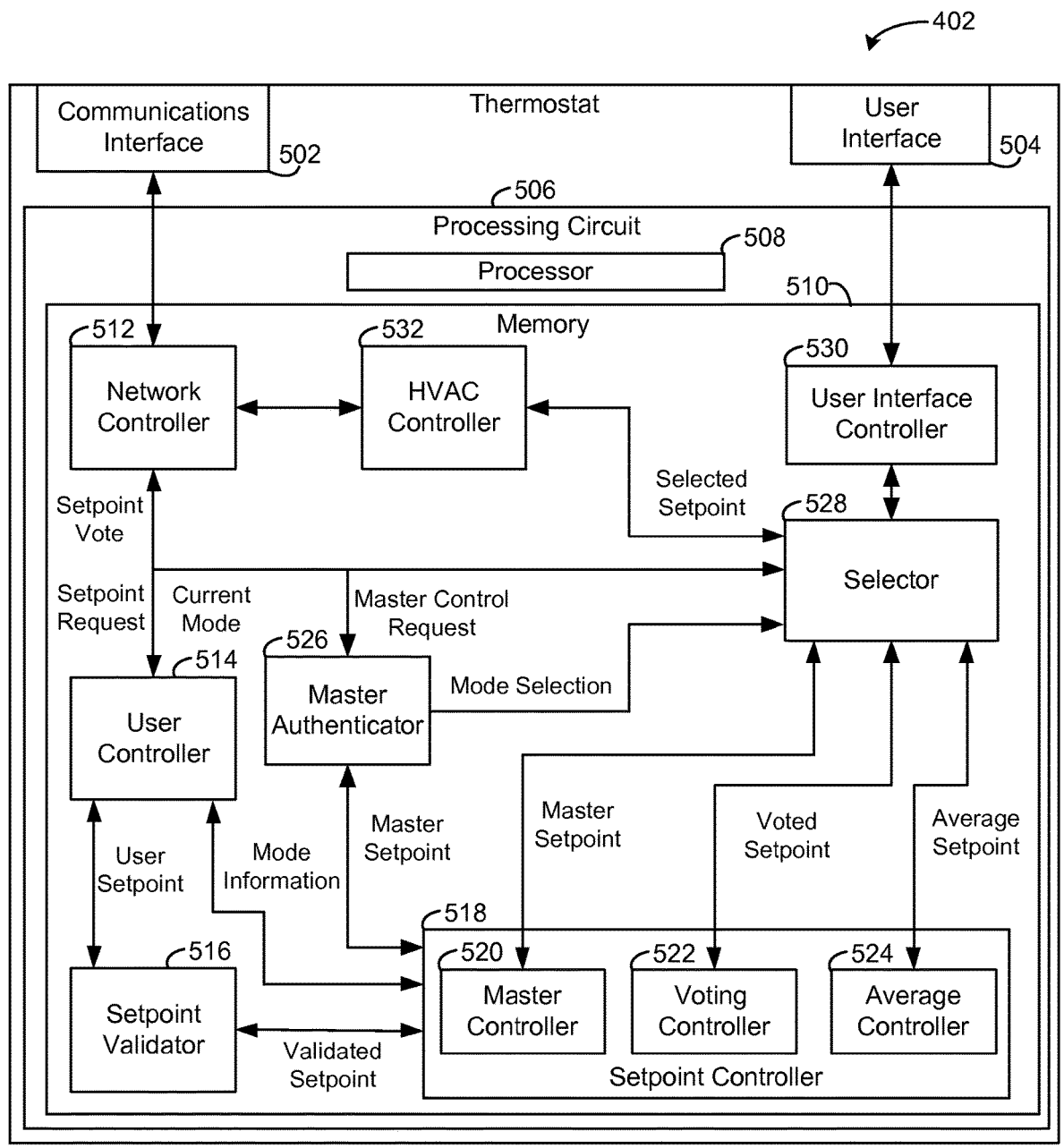
FIG. 5 is a block diagram of the thermostat of FIG. 4 in greater detail, according to an exemplary embodiment.

Referring now to FIG. 5, a block diagram illustrating thermostat 402 in greater detail is shown, according to an exemplary embodiment. Thermostat 402 is shown to include a communications interface 502, a user interface 504, and a processing circuit 506. Communications interface 502 can be configured to communicate via local area networks (e.g., a building LAN), wide area networks (e.g., the Internet, a cellular network, etc.), conduct direct communications (e.g., NFC, Bluetooth, etc.) ad hoc with devices (e.g., ad hoc Wi-Fi, ad hoc Zigbee, ad hoc Bluetooth, NFC etc.), and/or with ad hoc networks (e.g., MANET, a VANET, a SPAN, an IMANET, and any other ad hoc network).

Communications interface 502 may be the physical medium through which thermostat 402 communicates with HVAC equipment 404, building management system 406, user device A 410, user device B 412, network 408 and/or master device 414 via network 408 as described with reference to FIG. 4. In some embodiments, communications interface 502 includes various connectors, amplifiers, filters, controllers, transformers, radios, impedance matching circuits, and/or any other component necessary for communicating via network 408 and/or with various systems, devices, and/or equipment. In some embodiments, communications interface 502 can include one or more wireless transceivers (e.g., a Wi-Fi transceiver, a Bluetooth transceiver, a NFC transceiver, a cellular transceiver, etc.) for communicating with mobile devices (e.g., user device A 410, user device B 412, and master device 414).

User interface 504 may be configured to display images and/or content to a user and receive input from a user. In some embodiments, user interface 504 is at least one of a capacitive touch screen, a projective capacitive touch screen, a resistive touch screen, a LCD screen, a LED screen, and/or any other screen, touch screen and/or combination of screen and/or touch screen. In various embodiments, user interface 504 includes various buttons and/or switches for receiving various inputs.

Processing circuit 506 is shown to include a processor 508 and memory 510. Processor 508 can be a general purpose or specific purpose processor, an application specific integrated circuit (ASIC), one or more field programmable gate arrays (FPGAs), a group of processing components, and/or other suitable processing components. Processor 508 may be configured to execute computer code and/or instructions stored in memory 510 or received from other computer readable media (e.g., CDROM, network storage, a remote server, etc.).

Memory 510 can include one or more devices (e.g., memory units, memory devices, storage devices, etc.) for storing data and/or computer code for completing and/or facilitating the various processes described in the present disclosure. Memory 510 can include random access memory (RAM), read-only memory (ROM), hard drive storage, temporary storage, non-volatile memory, flash memory, optical memory, or any other suitable memory for storing software objects and/or computer instructions. Memory 510 can include database components, object code components, script components, or any other type of information structure for supporting the various activities and information structures described in the present disclosure. Memory 510 can be communicably connected to processor 508 via processing circuit 506 and can include computer code for executing (e.g., by processor 508) one or more processes described herein.

Memory 510 is shown to include network controller 512. In various embodiments, network controller 512 includes commands to implement various network protocols and/or communications by controlling communications interface 502. In some embodiments, network controller 512 is configured to operate one or a combinations of a Wi-Fi network, a wired Ethernet network, a Zigbee network, and a Bluetooth network. In some embodiments, network controller 512 operates an HVAC network. In various embodiments, the HVAC network uses a proprietary communication protocol. Network controller 512 can be configured to control communications interface 502 to operate a local area network or a wide area network (e.g., the Internet, a building WAN, etc.) and may use a variety of communications protocols (e.g., N2, BACnet, BACnet MS/TP, IP, LON, etc.) In various embodiments, the communications protocols may be physically implemented over RS-485, RS-232, RS-422, PS/2, USB, fire wire, Ethernet, Zigbee, Wi-Fi, etc. In some embodiments, the communications protocol is for an adhoc connection (e.g., ad hoc Wi-Fi, ad hoc Zigbee, ad hoc Bluetooth, NFC, etc.) In some embodiments, the protocol is for a MANET, a VANET, a SPAN, an IMANET, and/or any other ad hoc network In some embodiments, network controller 512 is configured to receive setpoint requests from one or more user devices (e.g., user device A 410, user device B 412, master device 414, etc.) via network 408 and communications interface 502. The setpoint request may come from thermostat application 418. In some embodiments, network controller 512 sends a setpoint request to user controller 514. The setpoint request may include a setpoint and a length of time that the user of the user device will be in a zone and/or building controlled by thermostat 402. In various embodiments, the setpoint requests are received via user interface 504. User controller 514 can be configured to receive any information such as setpoint requests, mode requests, etc. from at least users associated with user device A 410, user device B 412, master device 414 and/or any other user.

User controller 514 can be configured to handle all setpoint requests received from a user device (e.g., user device A 410, user device B 412, master device 414, etc.). In some embodiments, user controller 514 receives an operating mode from selector 528, based on the operating mode received from selector 528, user controller 514 can be configured to send the requested setpoint to setpoint validator 516 or send a message to the user device. When the mode is average mode, user controller 514 may be configured to send the requested setpoint to setpoint validator 516. If the mode is master mode, user controller 514 may send a message to the user device identifying the current master of thermostat 402 and inform the user of the user device that they are not authorized to change the setpoint. Identifying the master may be sending a picture of the master, sending a name of the master, and/or sending contact information of the master. The master may be the master user associated with master device 414. In various embodiments, a message may be sent to a current master allowing the master (i.e., master user) to accept the requested setpoint and/or reject the requested setpoint. When the operating mode of thermostat 402 is average mode, the user may receive a message via the user device asking if the user wishes to begin a vote among all users linked (i.e., logged in) to thermostat 402 regarding the requested setpoint. In various embodiments, a user can send a command from their user device to user controller 514 to begin a vote for a setpoint.

User controller 514 can be configured to allow a user and/or a user device (e.g., user device A 410, user device B 412, and/or master device 414) to request an operating mode for thermostat 402. In some embodiments, user controller 514 may be configured to send a message to a master and/or a device associated with the master (i.e., master device 414) asking the master to accept or reject the mode change request. The master can reply to the request and approve the requested mode or reject the requested mode. Based on decision of the master, selector 528, master authenticator 526 and/or user controller 514 can cause the requested mode to be implemented.

User controller 514 may allow a user to login with thermostat 402. In some embodiments, user controller 514 may be configured to keep a record of all users logged into thermostat 402. When a user logins in with user controller 514, they may enter a username and/or password via thermostat application 418 and/or user interface 504. In various embodiments, user controller 514 may be configured to prompt a user to register with thermostat 402. User controller 514 may be configured to cause a user to enter a user name and password via thermostat application 418 and/or user interface 504 and may generate a profile for the user. User controller 514 can be configured to receive a device identifier (i.e., an encrypted key, a UDID, a MAC address, etc.) from the user device (e.g., user device A 410, user device B 412, and/or master device 414) of the user. User controller 514 can be configured to automatically authenticate and/or login the user with thermostat 402 based on the device identifier sent to user controller 514 from the user device. Logging in with thermostat 402 may be temporary, for instance the user may simply be identified by a device identifier or the user may enter a temporary handle.

In some embodiments, user controller 514 is configured to automatically log out users. After a user has been logged in for a predefined amount of time and has been inactive, the user may be automatically logged out. Based on the users that are logged in, user controller 514 can be configured to send a vote request to all the users that are logged in when one of the logged in users requests a setpoint vote. In various embodiments, the vote request allows a user to vote for a setpoint and/or enter a new setpoint into the vote. The new setpoint can be voted on by some and/or all of the users logged into user controller 514

In various embodiments, user controller 514 is configured to communicate with building management system 406. In some embodiments, building management system 406 hosts a server which user device A 410, user device B 412, and/or master device 414 logs into. Building management system 406 can allow one or more of the user devices to initiate vote requests, initiate operating mode requests (i.e., average mode, master mode, voting mode), initiate setpoint requests, etc. Building management system 406 can have some and/or all of the functionality of user controller 514 allowing users to be logged into a central server (i.e., building management system 406) rather than directly with thermostat 402.

Setpoint validator 516 may be configured to filter setpoint requests received from user controller 514. In some embodiments, setpoint validator 516 identifies if the requested setpoint is within a predefined setpoint range. If the setpoint is outside the predefined range, the setpoint validator 516 may be configured to send a message to the user device (e.g., user device A 410, user device B 412, master device 414, etc.) informing the user of the user device that the setpoint that they have requested is invalid and/or is outside a proper operating range. In various embodiments, the predefined range is a range surrounding the current average setpoint. The predefined range may prevent an individual from driving an average up and/or down by requesting an extreme setpoint (i.e., a temperature outside the predefined range). In some embodiments, the predefined setpoint range corresponds to an operating range of HVAC equipment 404. In various embodiments, the predefined setpoint range corresponds to an operating range which will not damage (i.e., continuously run) the HVAC equipment 404.

Setpoint validator 516 may be configured to validate a setpoint based on a time-to-setpoint associated with the setpoint. In some embodiments, the time-to-setpoint is determined from the setpoint received from the user controller 514. Setpoint validator 516 may store various information about any HVAC equipment (e.g., HVAC equipment 404) connected to thermostat 402. In some embodiments, the information includes a data table linking the time-to-setpoint associated with various setpoints (i.e., a lookup table). User controller 514 may store various technical specifications regarding the connected HVAC equipment. In some embodiments, various equipment models and/or calculation methods can be used to determine the time-to-setpoint based on the technical specifications. In some embodiments, setpoint validator 516 is configured to communicate with HVAC controller 532 and record, based on the operation of HVAC controller 532, various time-to-setpoints associated with setpoints and ambient zone temperatures. Based on the recordings, a historical model may be generated that can be used to determine time-to-setpoints based on the requested setpoint and/or the ambient temperature. An example of a thermostat determining a time-to-setpoint value is described in detail in U.S. patent application Ser. No. 15/260,298 filed Sep. 8, 2016.

Setpoint validator 516 can be configured to compare the time-to-setpoint determined for the setpoint received from user controller 514 to a length of time which the requesting user is anticipated to be in a zone controlled by thermostat 402. The setpoint request received by setpoint validator 516 may include and/or be accompanied by the length of time which the requesting user will be in the zone controlled by thermostat 402. In some embodiments, setpoint validator 516 is configured to validate the setpoint by comparing the time-to-setpoint determined for the requested setpoint to the length of time which the requesting user will be in the zone controlled by thermostat 402. In some embodiments, a setpoint that has a time-to-setpoint a predefined amount of time less than the length of time the requesting user will be in the zone is validated and sent to setpoint controller 518. In various embodiments, a setpoint that has a time-to-setpoint longer than a predefined amount of time is determined to be illegitimate and is not sent to setpoint controller 518, or may be ignored by setpoint controller 518. In various embodiments, a setpoint that has a time-to-setpoint longer than an amount of time the user will be in the zone controlled by the thermostat may be ignored by setpoint controller 518.

In various embodiments, setpoint validator 516 may send the requested setpoint to setpoint controller 518 when the requested setpoint is within the predefined range. Setpoint validator 516 may be configured to send the upper bound setpoint of the predefined setpoint range to setpoint controller 518 when the requested setpoint exceeds the predefined setpoint range. In various embodiments, setpoint validator 516 may be configured to send the lower bound setpoint of the predefined setpoint range to setpoint controller 518 when the requested setpoint is below the lower limit of the predefined setpoint range.

In some embodiments, setpoint validator 516 may have a hard time-to-setpoint limit. The hard time-to-setpoint limit may be a predefined amount of time which is used to filter setpoint requests and avoid damaging any HVAC equipment (e.g., HVAC equipment 404) that thermostat 402 may control. The hard time-to-setpoint limit may prevent HVAC equipment from running continuously and/or for a length of time which may damage the HVAC equipment. In some embodiments, a time-to-setpoint associated with a requested setpoint which is below the hard time-to-setpoint limit may be considered a validated setpoint and may be sent to setpoint controller 518. A time-to-setpoint associated with a requested setpoint that is above the hard time-to-setpoint limit may be considered an illegitimate setpoint and may not be sent to setpoint controller 518.

In some embodiments, setpoint validator 516 is configured to monitor which users are logged into thermostat 402. In some embodiments, setpoint validator 516 may communicate with user controller 514 to ascertain which users are logged into thermostat 402. In some embodiments, setpoint validator 516 and/or user controller 514 may periodically send a message to one or more devices of users that are logged into thermostat 402 and ask if the user is still in the zone that thermostat 402 controls. In various embodiments, thermostat 402 (i.e., user controller 514 and/or setpoint validator 516) may be configured to automatically log out a user who has been inactive for a predefined amount of time. Based on the users who are active, inactive, and/or identify as being in or outside the zone that thermostat 402 controls, setpoint validator 516 may be configured to cause setpoint controller 518 to not consider any setpoints associated with users that are inactive and/or are no longer in the zone controlled by thermostat 402. In some embodiments, not considering a setpoint involves average controller 524 recalculating the average setpoint value without the setpoint associated with the inactive and/or not present user.

Setpoint controller 518 may include a master controller 520, a voting controller 522, and an average controller 524. Master controller 520 may be configured to ignore any setpoint received by setpoint controller 518 unless the setpoint is a master setpoint. A master setpoint may be any setpoint that is requested by an individual and/or device that is a master (i.e., master device 414). Master controller 520 is configured to send the master setpoint to selector 528. In various embodiments, master controller 520 may be configured to allow any user to change the setpoint when the master is not logged in with thermostat 402.

Voting controller 522 may be configured to send a voted setpoint to selector 528. In some embodiments, voting controller 522 is configured to receive a voted setpoint from user controller 514 and/or setpoint validator 516 when a vote has taken place for a requested setpoint. In some embodiments, voting controller 522 is configured to facilitate a setpoint vote among all users logged in with thermostat 402. User controller 514 may provide voting controller 522 with the users who are logged into thermostat 402. When one of the users logged into thermostat 402 requests a setpoint vote, voting controller 522 may send a vote for the setpoint to each of the users logged into thermostat 402. In various embodiments, voting controller 522 allows each and/or a subset of the users logged into thermostat 402 to propose alternate setpoints for the setpoint vote. When there are one or more setpoints being voted for, voting controller 522 may be configured to facilitate a multi-setpoint vote among the users logged into thermostat 402. In various embodiments, a master, via a master device (i.e. master device 414) can allow and/or veto a vote by sending a command to thermostat 402 via the master device. Vetoing the vote may cause the setpoint vote to be cancelled immediately. In some embodiments, the master can veto the vote after the setpoint vote has finished if the master does not like the result of the setpoint vote.

Average controller 524 can be configured to average one or more setpoint requests received from setpoint validator 516. In some embodiments, average controller 524 may be configured to maintain a running average setpoint. Every time setpoint controller 518 receives a new setpoint request from setpoint validator 516 and/or user controller 514, average controller 524 may be configured to average the new setpoint request with the current setpoint average. Average controller 524 may be configured to send the average setpoint generated by average controller 524 to selector 528. Each setpoint request received by average controller 524 may include and/or be accompanied by a length of time which the requesting user will be in the zone and/or building controlled by thermostat 402. In some embodiments, the setpoint average is a weighted average of one or more setpoint requests. Each setpoint request may be weighted based on the length of time the requesting user will be in the zone.

Master authenticator 526 may be configured to identify and/or authenticate a master and/or master device (e.g., master device 414). In some embodiments, master authenticator 526 causes a login screen to appear on the master device (i.e., display 416) and/or user interface 504 of thermostat 402 and causes the master (i.e., the user) of the master device to enter a user name and/or password to authenticate the master device with thermostat 402. In various embodiments, a unique device identifier is used to automatically authenticate with thermostat 402. In various embodiment's, the unique device identifier is at least one of a MAC address, a UDID, a UDIF, an android device identifier, and/or any other device identifier. Further, various master setpoint requests, mode selections, and/or any other information can be received by master authenticator from master device 414 and/or user interface 504.

Selector 528 may be configured to receive a mode selection from master authenticator 526. In some embodiments, selector 528 may be configured to activate and/or deactivate at least one of master controller 520, voting controller 522, and/or average controller 524. In some embodiments, selector 528 may be a three-to-one multiplexer. Selector 528 may be configured to select between the master setpoint received from master controller 520, the voted setpoint received form voting controller 522, and the average setpoint received from average controller 524. Selector 528 is shown to send the selected and/or received setpoint to HVAC controller 532. In some embodiments, selector 528 is configured to activate and/or select at least one of master controller 520, voting controller 522, and average controller 524 based on a mode selection received from a master authenticator 526.

In some embodiments, user interface controller 530 is configured to control the operation of user interface 504. User interface controller 530 can be configured to display content (i.e., images, text, videos, etc.) to a user and receive input from the user. User interface controller 530 may be configured to display the current setpoint on user interface 504. In various embodiments, user interface controller 530 allows a master (i.e., the current master) to access the thermostat 402, authenticate with master authenticator 526, select an operating mode for selector 528, and/or send a master setpoint to setpoint controller 518.

User interface controller 530 may display the identity of the current thermostat master. In various embodiments, when a user tries to adjust the setpoint via user interface 504, user interface controller 530 is configured to alert the user that the user is unable to change the setpoint. User interface controller 530 may also be configured to display the identity of the thermostat master and may display picture of the face of the thermostat master.

User interface controller 530 may also be configured to allow a user to login with thermostat 402, request a setpoint via user interface 504, and/or initiate a vote via user controller 514 and user interface 504. In some embodiments, a master can login via user interface 504, set the operating mode of thermostat 402, set the master setpoint, and/or perform any other action. In various embodiments, any action that can be performed via thermostat application 418 can be performed via user interface 504 and/or user interface controller 530. In various embodiments, a user may interact with user interface 504 to initiate a setpoint vote. The setpoint vote may cause various devices in the zone of that thermostat 402 is located in to receive a notification of a setpoint vote and a prompt to participate in the vote. In various embodiments, some and/or all the functionality of user controller 514 and master authenticator 526 can be performed by user interface controller 530 and user interface 504.

HVAC controller 532 can be configured to control HVAC equipment (e.g., HVAC equipment 404) to a temperature setpoint. HVAC controller 532 can be configured to cause HVAC equipment to heat and/or cool a zone of a building (e.g., building 10) and/or the entire building. In various embodiments, HVAC controller 532 can be configured to send a setpoint to building management system 406. Building management system 606 can be configured to control the HVAC equipment 404 to the setpoint received from HVAC controller 532. HVAC controller 532 is shown to receive a selected setpoint from selector 528. In various embodiments, the selected setpoint is a master setpoint generated and/or determined by master controller 520, a voted setpoint generated and/or determined by voting controller 522, and/or an average setpoint generated and/or determined by average controller 524. HVAC controller 532 can be configured to control and/or generate control signals for HVAC equipment (e.g., HVAC equipment 404). Controlling the HVAC equipment may cause the HVAC equipment to the selected setpoint and/or may cause building management system 606 to control the HVAC equipment to control the ambient temperature of a zone and/or building to the selected setpoint.

HVAC controller 532 may use any of a variety of control algorithms (e.g., state-based algorithms, extremum-seeking control algorithms, proportional algorithms, proportional integral algorithms, PID control algorithms, model predictive control algorithms, feedback control algorithms, etc.) to determine appropriate control actions for any HVAC equipment as a function of temperature and/or humidity. For example, if the ambient temperature of a zone and/or a building (e.g., building 10) is above a temperature set point, HVAC controller 532 may determine that a cooling coil and/or a fan should be activated to decrease the temperature of an supply air delivered to a building zone. Similarly, if the ambient temperature is below the temperature set point, HVAC controller 532 may determine that a heating coil and/or a fan should be activated to increase the temperature of the supply air delivered to the building zone. HVAC controller 532 may determine that a humidification or dehumidification component of the HVAC equipment should be activated or deactivated to control the ambient relative humidity to a humidity set point for a building zone and/or the building.

Figure 6:
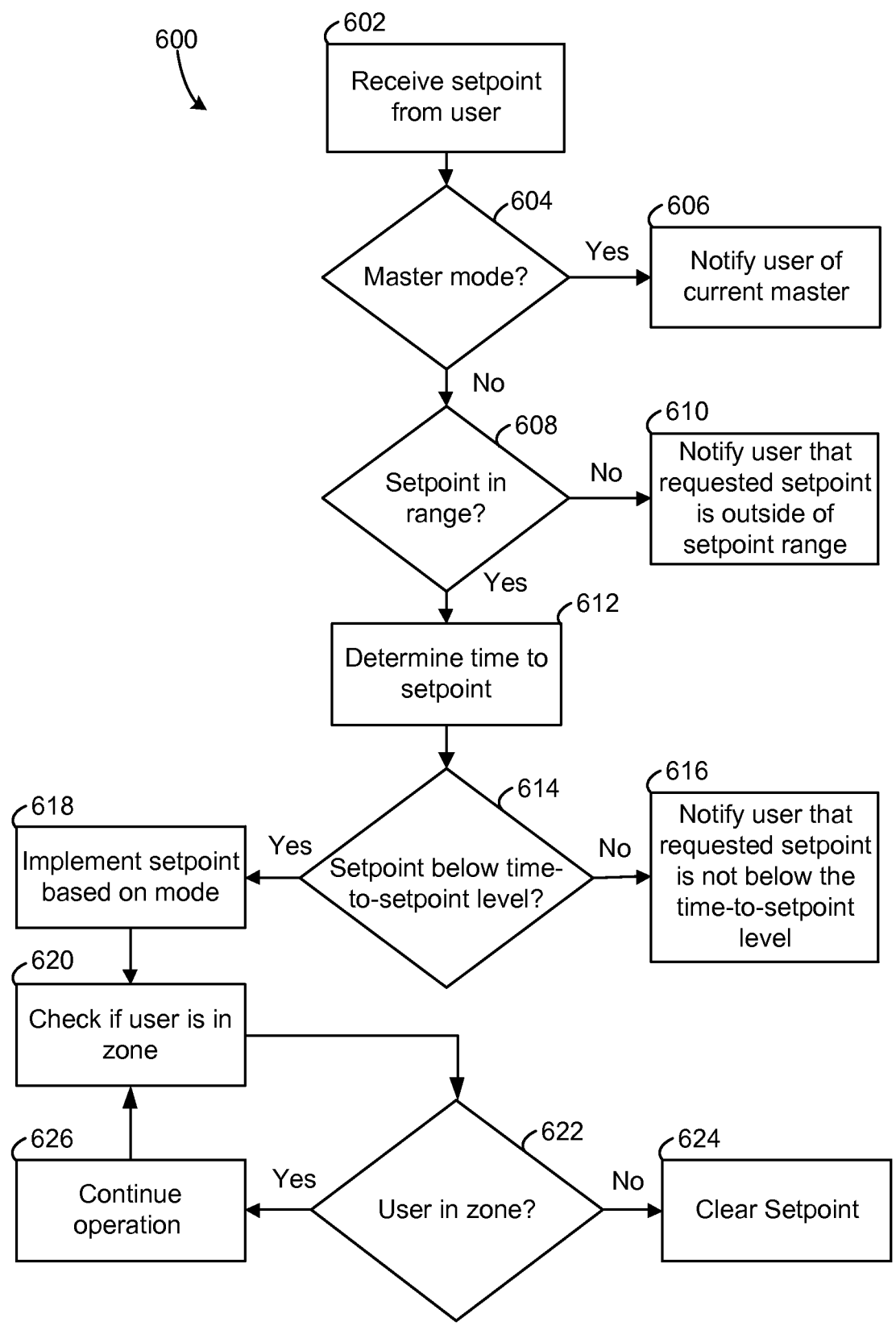
FIG. 6 is a flow diagram of operations for validating a setpoint with the thermostat of FIGS. 4-5, according to an exemplary embodiment.

Referring now to FIG. 6, a flow diagram of process 600 for receiving a setpoint and validating the setpoint is shown, according to an exemplary embodiment. In some embodiments, process 600 is performed by thermostat 402, as described with reference to FIGS. 4-5. The various operating modes described in process 600 such as master mode, voting mode, and average mode may correspond to controlling thermostat 402 with master controller 520, voting controller 522, and/or average controller 524. In step 602, thermostat 402 receives a setpoint from a user. In some embodiments, the setpoint is received from a user device (e.g., a cell phone, a laptop, user device A 410, user device B 412, master device 414, etc.). In various embodiments, the setpoint is received from user interface 504. In step 604, thermostat 402 determines if thermostat 402 is operating in a master mode. If the thermostat 402 is operating in a master mode, thermostat 402 may notify the current master and/or master device (e.g., master device 414) of the requested setpoint and allow the master to allow or reject the setpoint. In various embodiments, the user receives a notification on their user device and/or via user interface 504 identifying the current master (i.e., thermostat master) (step 606). The user device may display the name of the master, a message indicating that the user must ask the master to change the setpoint, a picture of the master, and/or any other information.

If thermostat 402 is not in a master mode, thermostat 402 may determine if the setpoint received from the user is within a predefined setpoint range (step 608). In some embodiments, the predefined setpoint range is a predefined amount above and below an average setpoint value determined by average controller 524. The average setpoint value may be the setpoint value determined by average controller 524. In various embodiments, the predefined setpoint range is a range which thermostat 402 can operate HVAC equipment safely without fear of damaging the equipment. When thermostat 402 determines that the requested setpoint received from the user is not within the predefined range and/or predefined ranges, thermostat 402 may notify the requesting user that they have requested an illegitimate setpoint (step 610). The notification may include the allowable range and prompt the user to select another setpoint. The notification may be served to the user via the user device. In various embodiments, the notification is displayed on user interface 504.

Thermostat 402 may determine a time-to-setpoint value for the requested setpoint (step 612). In various embodiments, the setpoint is determined based on the ambient temperature of a zone and/or a building (e.g., building 10) and the performance ability (i.e., past performance, equipment ratings, etc.) of the HVAC equipment controlled by thermostat 402. Thermostat 402 may compare the time-to-setpoint determined in step 612 to a time-to-setpoint threshold (step 614). The time-to-setpoint threshold may be generated based on the user. If the time-to-setpoint is not less than the time-to-setpoint threshold, the setpoint associated with the time-to-setpoint may be determined to be illegitimate. For example, if the user indicates that the user will only be in the zone controlled by thermostat 402 for a certain amount of time and the requested setpoint will not be achieved within the predefined amount of time, thermostat 402 may notify the user that the requested setpoint is illegitimate (i.e., below the time-to-setpoint threshold) (step 616).

If the time-to-setpoint associated with the requested setpoint is within the time-to-setpoint range, thermostat 402 may be configured to implement the setpoint based on the current operating mode of thermostat 402 (step 618). If the current operating mode is average mode, thermostat 402 may be configured to average the current thermostat setpoint with the requested setpoint. In various embodiments, the average calculation may be weighted based on the length of time each user requesting a setpoint will be in the zone controlled by thermostat 402. If the current operating mode is voting mode, thermostat 402 may be configured to send a vote notification to any other users logged in with thermostat 402. The vote may be to accept or reject the setpoint.

In step 620, thermostat 402 may determine if the user is still in the zone controlled by thermostat 402. In various embodiments, this determination is performed by identifying which devices (i.e., users) are currently logged in with thermostat 402 and/or building management system 406. In various embodiments, thermostat 402 may be configured to send a notification to a user (i.e., a user device) asking if the user is still in the zone controlled by thermostat 402.

If the user is not in the zone controlled by thermostat 402 (step 622) thermostat 402 may clear the setpoint associated with the user. If the thermostat is in an average mode, the thermostat 402 may re-average the setpoints without the setpoint requested by the user determined to no longer be in the zone controlled by thermostat 402. If the user is still in the zone controlled by thermostat 402 (step 622), thermostat 402 may continue operating in its current mode with its current setpoint (step 626). Process 600 can periodically perform steps 620 and 622.

Figure 7:
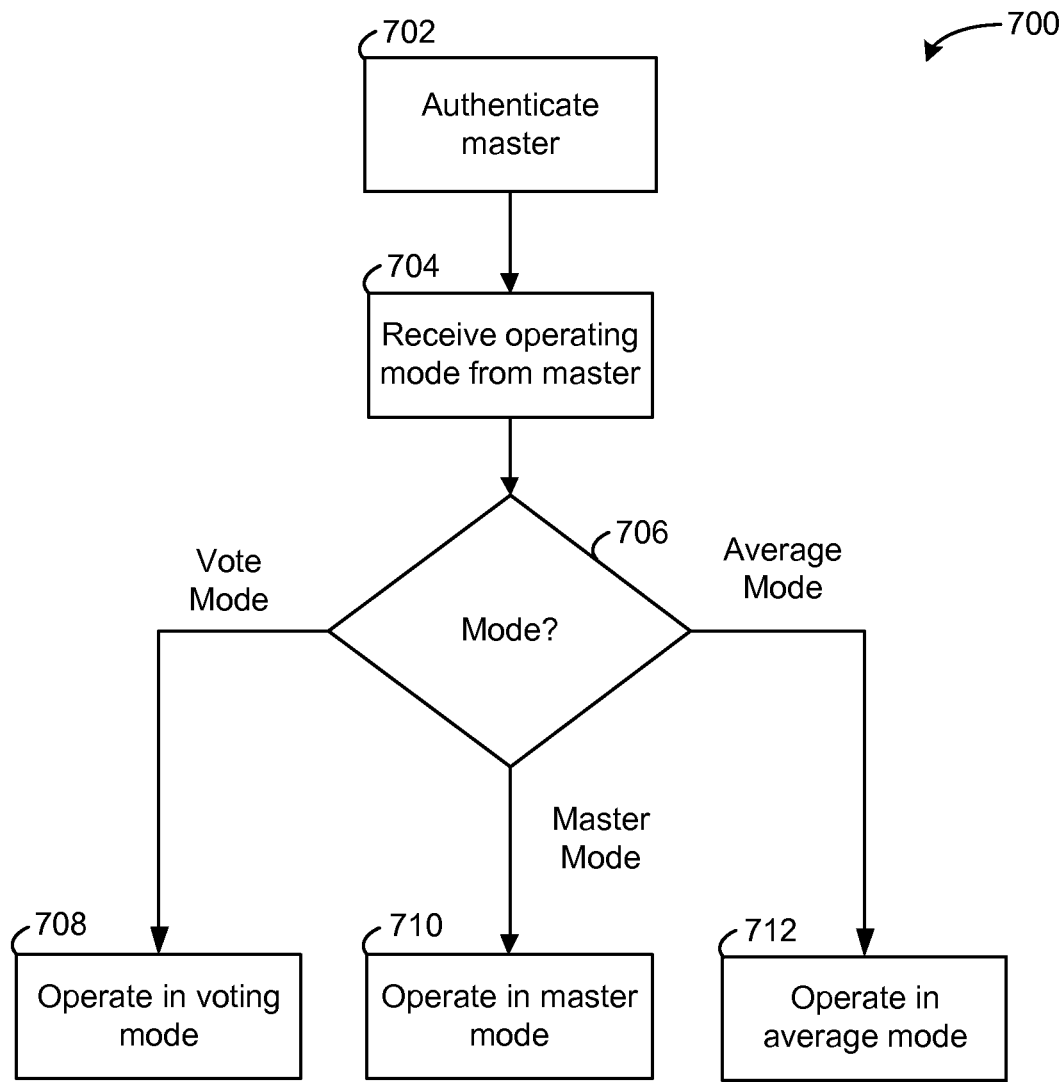
FIG. 7 is a flow diagram of operations for selecting the operating mode of the thermostat of FIGS. 4-5, according to an exemplary embodiment.

Referring now to FIG. 7, a flow diagram of process 700 is shown for selecting an operating mode for a thermostat, according to an exemplary embodiment. Process 700 can be performed by thermostat 402. The operating modes referred to in process 700 such as master mode, voting mode, and average mode may correspond to controlling thermostat 402 with master controller 520, voting controller 522, and/or average controller 524. In step 702, thermostat 402 receives a login attempt from a user device. In some embodiments, the login attempt is manual, i.e., entering a user name and a password via user interface 504 and/or via a user device (e.g., user device A 410, user device B 412, master device 414, etc.). In various embodiments, the login attempt is automatic based on user names and passwords saved by the device and/or based on a device identifier. In step 702, thermostat 402 is configured to determine if the login attempt received from the user device and/or user interface 504 comes from a master.

After the master has been authenticated in step 702, thermostat 402 may be configured to receive an operating mode from the master (step 704). In some embodiments, the operating mode selection is received from at least one of a user device of the master and/or the user interface 504. The master may be able to select one or more modes. The modes may be a voting mode, a master mode, and/or an average mode. If the master selects voting mode (step 706) thermostat 402 may be configured to select voting mode 708 and begin operating in a mode in which users can vote for a setpoint. If the master selects a master mode (step 710) thermostat 402 may be configured to operate in a master mode (step 710). In master mode, the master may be the only individual able to change the setpoint. In master mode, if a user attempts to change the setpoint, a message may be sent to the master allowing the master to accept and/or reject the setpoint request. If the master selects average mode (step 706) the thermostat 402 may be configured to operate in an average mode. In an average mode, all requested setpoints may be averaged and the average may be the setpoint to which various HVAC devices and systems (e.g., HVAC equipment 404) control the environmental temperature of one or more zones and/or a building.

Figure 8:
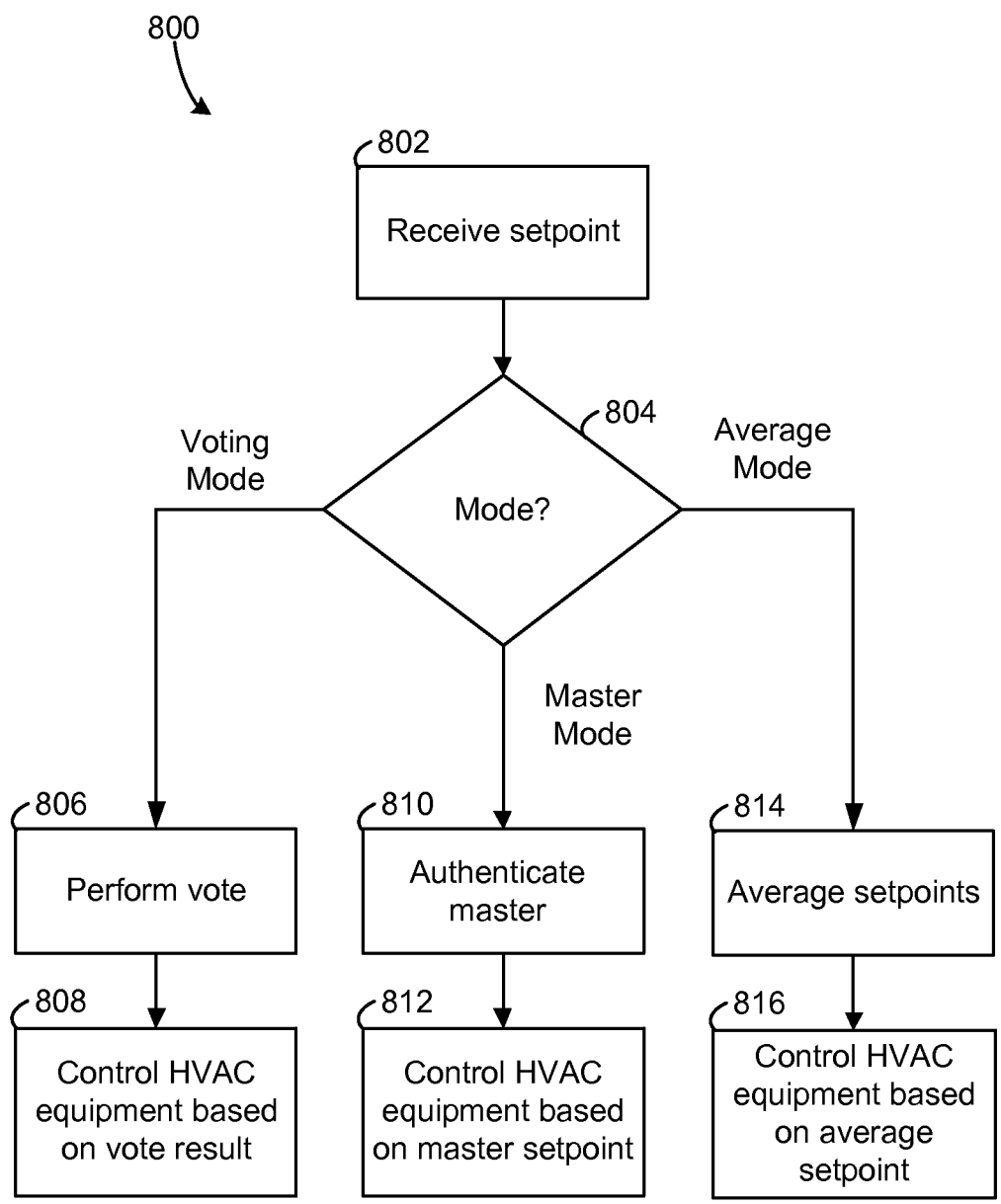
FIG. 8 is a flow diagram for operating the thermostat of FIGS. 4-5 in various modes, according to an exemplary embodiment.

Referring now to FIG. 8, a process 800 is shown for operating a thermostat in various modes, according to an exemplary embodiment. In step 802, thermostat 402 is configured to receive a setpoint from a user. In some embodiments, the user may be a master of thermostat 402 and/or any other user. In step 802, one or more setpoints (i.e., setpoint requests) may be received. In some embodiments, the user enters the setpoint via a user device (e.g., user device A 410, user device B 412, master device 414, etc.) and/or user interface 504. In some embodiments, step 802 includes validating the setpoint via a predefined setpoint range and/or a predefined time-to-setpoint as described with reference to process 600 of FIG. 6.

In step 804, thermostat 402 is configured to select various control actions based on the current mode of thermostat 402. If thermostat 402 is operating in a voting mode (step 804), thermostat 402 is configured to perform a vote (step 806). In step 806, thermostat 402 may be configured to send a message to one or more devices logged in with thermostat 402. Thermostat 402 may be configured to send the requested setpoint to each device logged in with thermostat 402 prompting the user of each device to vote for the proposed setpoint and/or propose a new setpoint to be voted on. In step 808, thermostat 402 controls HVAC equipment (e.g., HVAC equipment 404) to a setpoint as determined by the vote of step 806.

If thermostat 402 is operating in the master mode (step 804), thermostat 402 authenticates a master via a user device of the master and/or user interface 504 (step 810). In some embodiments, step 810 includes some or all of the operations of step 702 as described with reference to FIG. 7. Once the master is authenticated with thermostat 402, the master may be able to select a setpoint. In step 812, the HVAC equipment connected to thermostat 402 may be configured to be controlled to the setpoint received from the master (i.e., the master setpoint).

If the operating mode of thermostat 402 is average mode (step 804) the thermostat 402 may be configured to average one or more setpoints (step 814). In some embodiments, thermostat 402 receives one or more setpoints in step 802. Thermostat 402 may be configured to average the setpoints to create an average setpoint. In various embodiments, thermostat 402 has a current average setpoint and receives one or more additional setpoints in step 802. Thermostat 402 may be configured to average the current setpoint average with the additional setpoints. In some embodiments, each setpoint is associated with a length of time a user will be in a zone controlled by thermostat 402. Thermostat 402 may perform a weighted average of the setpoints based on the length of time the user will be in the zone. In step 816, thermostat 402 controls the HVAC equipment connected to thermostat 402 to heat and/or cool a zone and/or a building (e.g., building 10) to the average setpoint.

Figure 9:
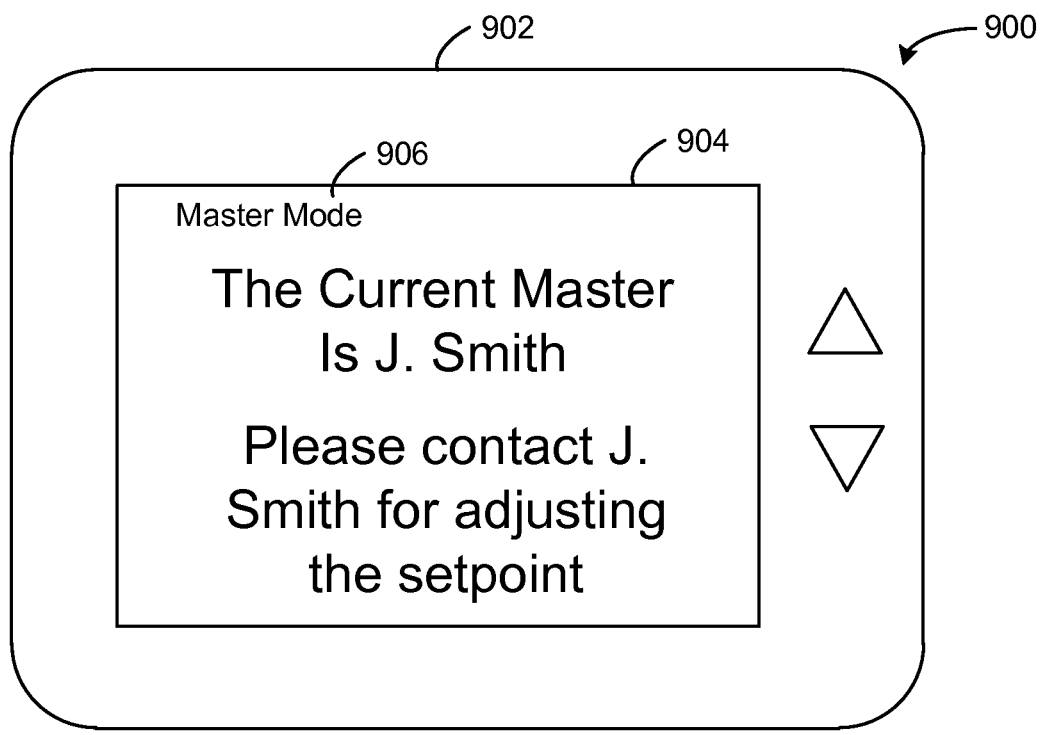
FIG. 9 is a drawing of the user interface for the thermostat of FIGS. 4-5 and/or the user devices of FIG. 4 displaying a master message, according to an exemplary embodiment.

Referring now to FIG. 9, a drawing 900 of a device displaying the identifying a master is shown, according to an exemplary embodiment. Drawing 900 is shown to include a device 902. In some embodiments, device 902 is thermostat 402 as described with reference to FIGS. 4-5. In various embodiments, device 902 is user device A 410, user device B 412, and/or master device 414 as described with reference to FIG. 4. Device 902 is shown to include a screen 904. In some embodiments, screen 904 is user interface 504 as described with reference to FIG. 5. In various embodiments, screen 904 is display 416 as described with reference to FIG. 4.

Screen 904 is shown to display the operating mode 906. In FIG. 9, operating mode 906 is "Master Mode." In various embodiments, operating mode 906 can be "Average Mode," "Voting Mode," and/or any other operating mode and/or text describing an operating mode. Screen 904 is shown to display the identity of a master. In various embodiments, screen 904 may display a picture of the master, an office associated with the master, a phone number associated with the master, and/or any other information related to the master.

Figure 10:
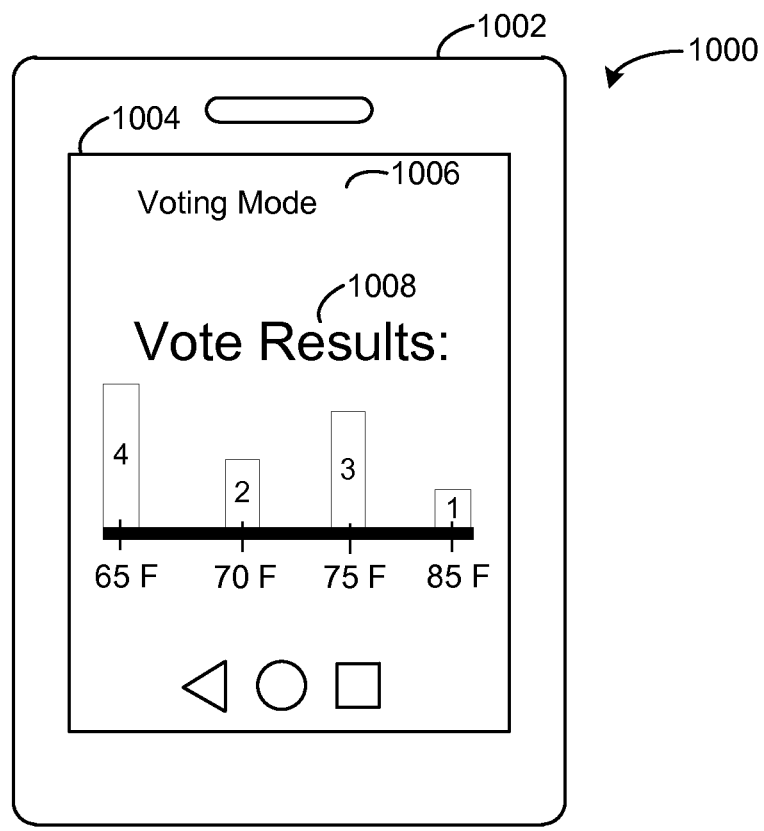
FIG. 10 is a drawing of the user interface for the thermostat of FIGS. 4-5 and/or the user devices of FIG. 4 displaying a setpoint vote, according to an exemplary embodiment.

Referring now to FIG. 10, a drawing 1000 of a device displaying a setpoint vote result is shown, according to an exemplary embodiment. Drawing 1000 is shown to include device 1002. In some embodiments, device 1002 is thermostat 402 as described with reference to FIGS. 4-5. In various embodiments, device 1002 is user device A 410, user device B 412, and/or master device 414 as described with reference to FIG. 4. Device 1002 is shown to include a screen 1004. In some embodiments, screen 1004 is user interface 504 as described with reference to FIG. 5. In various embodiments, screen 1004 is display 416 as described with reference to FIG. 4.

Screen 1004 is shown to include operating mode 1006 of device 1002. In FIG. 10, operating mode 1006 is "Voting Mode." In various embodiments, operating mode 1006 may be "Average Mode," "Master Mode," and/or any other mode of device 1002. In FIG. 10, voting results 1008 are shown. Voting results may include each setpoint that was voted on, and the number of votes associated with each setpoint. In some embodiments, a master may confirm (i.e., allow) the results of the election or veto (i.e., ignore) the results of the election. In various embodiments, a thermostat (e.g., thermostat 402) is configured to implement the setpoint that the most users have voted for.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A thermostat for a building space, the thermostat comprising:
    a communications interface configured to communicate with a plurality of user devices; and
    a processing circuit configured to:
    determine a first temperature setpoint based on input received from one of the plurality of user devices via the communications interface;
    determine a collaborative temperature setpoint based on a plurality of inputs received from the plurality of user devices via the communications interface;
    select the first temperature setpoint when operating in a master mode;
    select the collaborative temperature setpoint when operating in a collaborative mode; and
    generate and provide control signals for building equipment based on the selected temperature setpoint, wherein the control signals cause the building equipment to control an ambient temperature of the building space to the selected temperature setpoint.

2. The thermostat of claim 1, wherein the processing circuit is further configured to operate in each of the master mode and the collaborative mode, and wherein the processing circuit is also further configured such that the collaborative mode is selected from the group consisting of at least one of an average mode and a voting mode,
wherein the plurality of user devices comprise at least two user devices, wherein the processing circuit is configured to determine the collaborative temperature setpoint by:
generating a mean average temperature setpoint based on the input received from the at least two user devices in response to a determination that an operating mode of the thermostat is the average mode; and
generating a voted setpoint based on a setpoint with a highest number of votes in response to a determination that an operating mode is the voting mode, wherein the input received from the at least two user devices comprises votes for one or more setpoints.

3. The thermostat of claim 2, wherein the processing circuit is further configured to generate the mean average temperature setpoint in response to the determination that the operating mode of the thermostat is the average mode by:
determining user setpoints from the input received from the at least two user devices;
validating the user setpoints by determining that the user setpoints are within a predefined setpoint range; and
averaging the validated setpoints.

4. The thermostat of claim 3, wherein the processing circuit is further configured to receive, via the communications interface, one or more lengths of time that users of the at least two user devices will be in the building space from the at least two user devices;
wherein averaging the validated setpoints comprises determining a weighted average of the user setpoints based on each of the lengths of time associated with each user setpoint.

5. The thermostat of claim 3, wherein the processing circuit is further configured to generate the mean average temperature setpoint in response to the determination that the operating mode of the thermostat is the average mode by:
causing the communications interface to send a message to the at least two user devices, the message prompting users of the at least two user devices to indicate whether the users are in the building space;
receiving, via the communications interface, an indication from one or more of the at least two user devices that the users are in the building space; and
generating the mean average temperature setpoint based on the user setpoints associated with the users that are in the building space.

6. The thermostat of claim 2, wherein the processing circuit is further configured to generate the voted setpoint by:
sending, via the communications interface, a message to the at least two user devices, wherein the message comprises a prompt to vote for the one or more setpoints;
receiving, via the communications interface, one or more votes for the one or more setpoints from the at least two user devices;
setting the collaborative temperature setpoint to the setpoint with the highest number of votes in response to the determination that the thermostat is in the voting mode; and
selecting the collaborative temperature setpoint from the temperature setpoint and the collaborative temperature setpoint in response to the determination that the operating mode is in the voting mode.

7. The thermostat of claim 1, wherein the processing circuit is further configured to:
receive, via the communications interface, a request to set an operating mode of the thermostat to a requested operating mode from a first one of the one or more user devices;
send, via the communications interface, the request to a second one of the plurality of user devices and receive from the second one of the plurality of user devices, via the communications interface, a confirmation that the second one of the plurality of user devices has approved the request; and
set the operating mode of the thermostat to the requested operating mode in response to receiving the confirmation from the second one of the plurality of user devices.

8. The thermostat of claim 1, wherein the processing circuit is further configured to authenticate a one of the plurality of user devices and receive an operating mode from the authenticated one of the plurality of user devices via the communications interface.

9. The thermostat of claim 1, wherein the processing circuit is further configured to:
operate in the master mode, wherein an operating mode is one of an average mode, voting mode, or the master mode;
send a message to one of the plurality of user devices in response to a determination that the one of the plurality of user devices requests a temperature setpoint change;
wherein the message comprises an indication of an identity of a user of the one of the plurality of user devices.

* * * * *